Sept. 17, 1935.  A. ZOLLER  2,014,678
INTERNAL COMBUSTION ENGINE
Filed Oct. 19, 1932  3 Sheets-Sheet 1
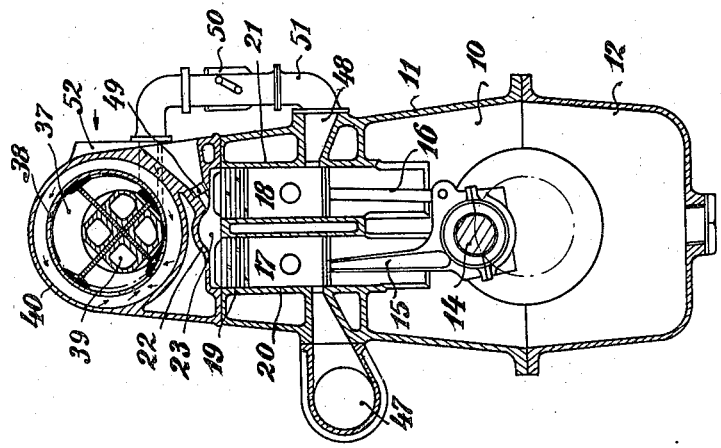
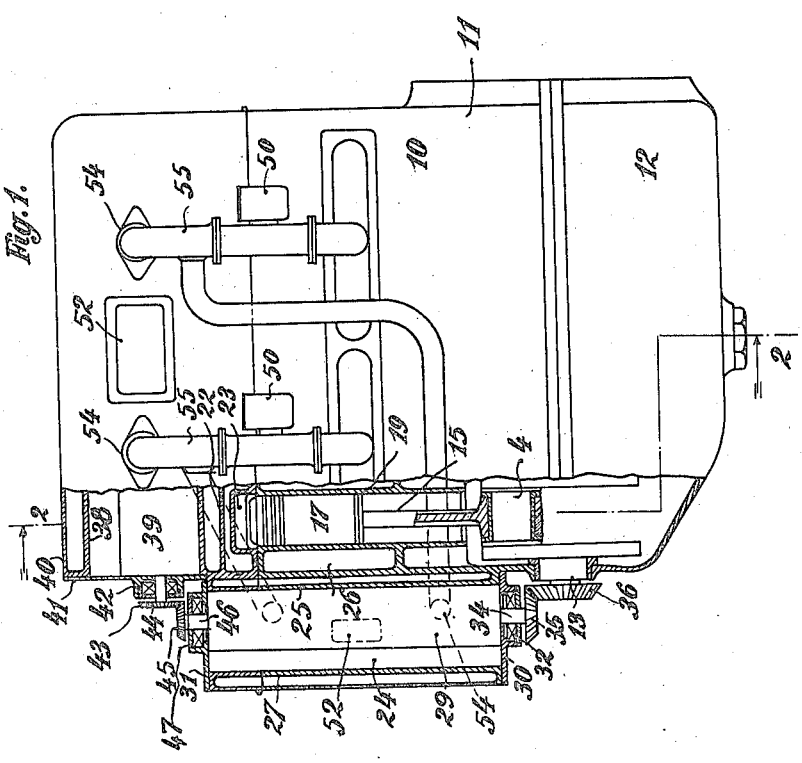

Sept. 17, 1935.  A. ZOLLER  2,014,678
INTERNAL COMBUSTION ENGINE
Filed Oct. 19, 1932   3 Sheets-Sheet 2
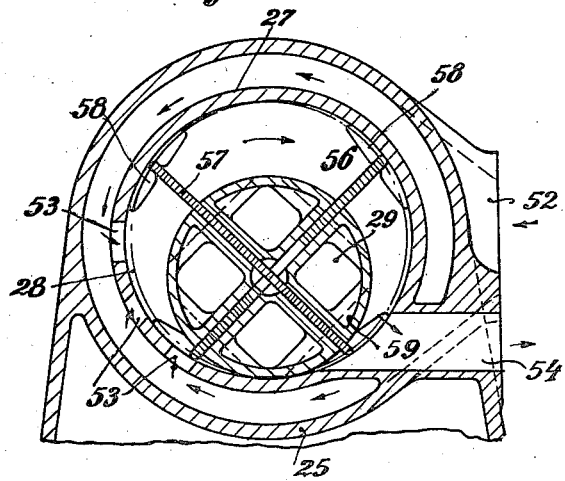
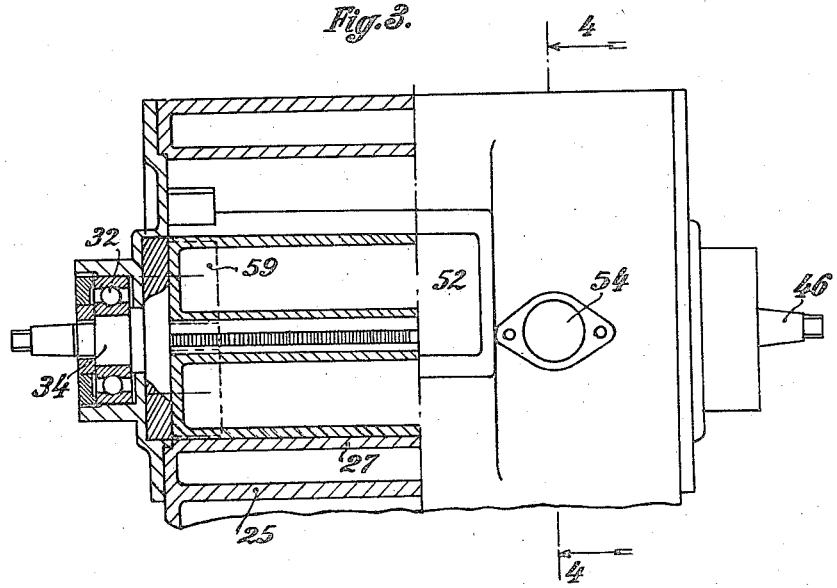

Sept. 17, 1935.  A. ZOLLER  2,014,678
INTERNAL COMBUSTION ENGINE
Filed Oct. 19, 1932    3 Sheets-Sheet 3
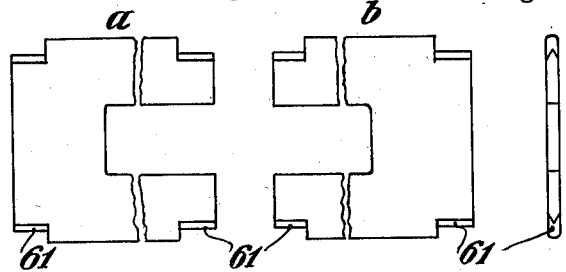
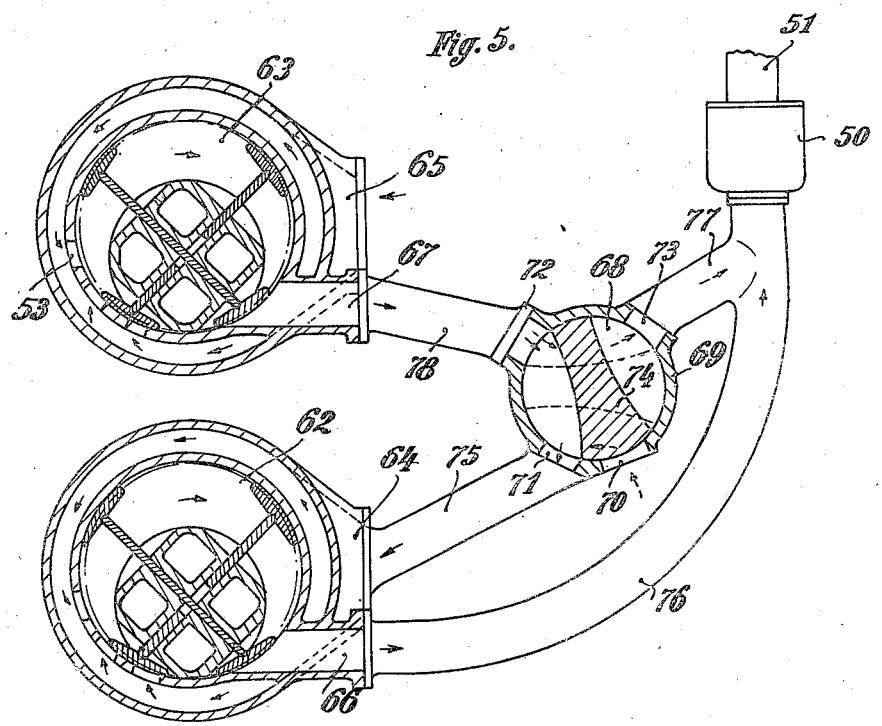

Patented Sept. 17, 1935

2,014,678

UNITED STATES PATENT OFFICE 2,014,678

INTERNAL COMBUSTION ENGINE

Arnold Zoller, Berlin, Germany

Application October 19, 1932, Serial No. 638,609
In Germany October 24, 1931

12 Claims. (Cl. 123—53)

This invention relates to internal combustion engines and more particularly to such engines which are provided with compressors for overloading the combustion chambers of the engines and in which the compressor is adapted to supply the cylinders of the engine with air or with a mixture of gas and air under pressure.

A first object of the invention is to provide an internal combustion engine with one or more compressors in which a compressor is arranged by the side of the cylinder or of the cylinders with their axes in parallel relation to each other in order to secure a favourable saving of space.

A further object of the invention is to provide in an internal combustion engine with several compressors the arrangement of one compressor with its axis parallel to the axis of the cylinders, the other compressor being arranged over the cylinder heads with its axis in transversal relation to the direction of the cylinder axes, both compressors being adapted either to operate in parallel relation with another, i. e. each compressor supplying the cylinders of the internal combustion engine with air or with a mixture of gas and air under the same pressure, or to operate in tandem relation with another, i. e. the one compressor and preferably the compressor the axis of which is parallel to the axes of the cylinders first compressing the fluid and then supplying the second compressor with said compressed fluid, so that said second compressor may further compress said fluid and deliver it to the engine.

A further object of the invention is to provide such an arrangement that the compressor mounted over the cylinders may be driven by means of the compressor mounted on the front face of the engine with its axis parallel to the cylinder axes.

A further object of the invention is to provide a compressor of a particular type with a casing of conchoidal form and a drum rotating in the casing and provided with vanes, in which a jacket surrounding the conchoidal casing with an interval is provided with an inlet for the fluid to be compressed opposite an inlet for the same fluid in the wall of the jacket for the casing.

A further object of the invention is to provide an arrangement in which the fluid to be compressed passes through the interval between the conchoidal casing and the jacket before entering the casing, so that the fluid entering the casing produces a cooling effect on the casing before entering the same.

A further object of the invention is to provide such compressors which are used together with an internal combustion engine with U-shaped cylinders.

A further object of the invention is to provide compressors for the aforementioned purpose with continuous vanes having outer shoes at their ends.

A further object of the invention is to provide a drum or rotor for such compressors with recesses into which the vane shoes may project when they come to the point where the drum lies nearest the conchoidal casing.

Other objects and advantages of the invention will become apparent from the following detailed description of a preferred embodiment of the invention taken in conjunction with the accompanying drawings. It is, however, to be understood that still many other forms of execution are possible which will be apparent to one acquainted with the art and that many changes may be made without departing from the scope of the invention as set forth in the appended claims.

In the drawings:

Figure 1 shows an internal combustion engine with compressors according to the invention, part in an elevational and part in a sectional view.

Figure 2 is a sectional view taken on line 2—2 of Figure 1 in the direction of the arrow.

Figure 3 shows one of the compressors on an enlarged scale, part in an elevational and part in a longitudinal sectional view.

Figure 4 is an enlarged sectional view through a compressor taken on line 4 — 4 viewed in the direction of the arrow, a portion of the engine casing being also shown.

Figure 5 is a diagrammatical view showing how the fluid is guided in the compressors and in the connecting pipes, the compressors and the distributor being shown in a sectional view.

Figures 6a and b are elevational views of the two vanes of a compressor.

Figure 7 is a side view of the vane of Figure 6a.

Figure 8 is a side view of a vane shoe, and

Figure 9 is a sectional view of the vane shoe.

Referring now to Figures 1 and 2 of the drawings, 10 is the internal combustion engine, 11 the crank case and 12 the crank trough. The crank shaft 13 carries the crank 14 to which are connected the main connecting rod 15 and the auxiliary connecting rod 16 for the pistons 17 and 18 respectively. The pistons reciprocate in a usual manner in the cylinder 19 which is U-shaped with the two legs 20 and 21. Both cylinder legs 20 and 21 are provided with the cylinder cover 22, the whole forming the common combustion chamber 23. In the embodiment shown, it is supposed that the engine is a six cylinder one, but only one cylinder is shown in a sectional view. Of course, however, the invention is not limited to such an engine and relates to single cylinder engines as well as to multi-cylinder engines. In the same manner, the invention may be applied to the usual engines with only one piston in each cylinder in lieu of two pistons in each cylinder, as shown.

The compressor 24 is parallel to the axis of the cylinder 19 so that the jacket 25 for the cylinder cooling chamber 26 also forms a jacket surrounding the casing 27 of the compressor 24. The casing 27 has a conchoidal form, as shown in a sectional view in Figure 4 in relation with the circular form 28. In the casing, excentrically mounted with respect to its axis, is the rotor drum 29. The vanes, vane shoes and arrangements for guiding the vanes pertaining to said rotor drum are shown more particularly in the Figures 3 and 4, in order to make the Figures 1 and 2 clearer. The space surrounded by the casing 27 is closed on both front sides in the lower part by the cover 30 and in the upper part by the cover 31. In said covers are mounted the antifriction bearings 32 and 33 respectively for the stub shafts 34 and 46 of the compressor drum or rotor. At the lower end of the stub shaft 34 is secured a bevel gear 35 engaging another bevel gear 36 secured to the crank shaft. Therefore, when the crank shaft 13 rotates, the rotor 29 of the compressor 24 is also rotated through the bevel gears 36, 35.

Mounted over the cylinders of the internal combustion engine is the second compressor 37, the axis of which is in transversal relation to the cylinder axes. The casing 38 and the rotor 39 of said compressor are formed in the same manner as for the compressor 24. The casing 38 is also surrounded with an interval by a jacket 40 forming a part of the cylinder head 22 together with the casing wall. The compressor casing 38 is closed on both sides by front plates 41 carrying antifriction bearings 42 for the axis 43 of the rotor. Onto the axis 43 is secured a bevel gear 44 engaging with the bevel gear 45 supported by bearing 47 at the upper end 46 of the shaft of the rotor 29.

It will be apparent that there is so provided an engine the compressors of which have a form which absolutely suits the form of the internal combustion engine and require a minimum of space. Such an arrangement has the particular advantage that the casing of the compressor 24 may be machined simultaneously with the cylinders of the internal combustion engine, because its axis is parallel to the axes of said cylinders. Accordingly, while the arrangement of a compressor alone on the cylinder heads does not form the object of the invention, the arrangement of a compressor the axis of which is parallel to the cylinders of the internal combustion engine is an essential feature of the invention, as well in the case that such a compressor is used alone as when said compressor is used together with a compressor mounted on the cylinder heads.

The cylinders of the internal combustion engine are further provided with an outlet passage 47 and an inlet passage 48 and with an igniting device 49 of known form mounted in the cover 22 and only diagrammatically indicated. Connected to the inlet 48 is the pipe 51 coming from the carburetter 50.

Each compressor is provided with an inlet 52 through which the air may enter the space between the casing walls 27 and 38 respectively and the jackets 25 and 40 respectively. Provided in the wall of the casing 27 are one or more openings 53 through which the air may enter the casing coming from the space between the jacket 25 and the wall 27. The openings 53 are provided substantially opposite the inlet 52, so that the entering air first flows over the casing wall 27 on the outer side of the same. Simultaneously the result of this is that the induction noises of the compressor are damped. Each compressor is provided with one or more outlet connecting branches 54 to which are connected the pipes 55 leading to the carburetter or to the carburetters.

Each compressor rotor has a pair of continuous vanes 56 and 57 which are shown apart in Figures 6a and 6b. Rotors with such vanes are already known, but the vanes according to the invention carry shoes 58 at their outer edges near the front walls of the compressor casing and the drum 29 has recesses 59 in which the shoes may be received when they reach their lower position during rotation of the drum in the direction of the arrow in Figure 4. The form of the vane shoes 58 is shown in Figures 8 and 9. Said shoes have a notch 60 into which the offset edge 61 of the vane 56 or 57, as the case may be, may project, so that the shoe 58 may reciprocate with respect to the vane 56 or 57. The rest of the arrangement of the rotor and particularly its connection with the stub shafts 34 and 46 forms no part of the invention.

The other arrangement of the compressors with respect to the internal combustion engine, as shown in Figure 5, is made for the purpose of rendering it possible to connect the compressors so that they work in parallel or in tandem relation, at will.

To this end, there are provided two compressors 62 and 63 which, in all essential parts, are similar to the above described compressors. The compressors 62 and 63 are provided with inlet connecting branches 64 and 65 and with outlet connecting branches 66 and 67 respectively. The internal combustion engine is provided with a carburetter 50, but, of course, there may be also a plurality of carburetters. The pipe 51 leads in a known manner from the carburetter to the inlet passages of the internal combustion engine. A control device 68 is provided which, in the example shown, comprises a multi-way valve shown in a sectional view. The casing 69 of said valve has the openings 70, 71, 72 and 73. A valve plug 74 of suitable form is rotatively mounted in the valve box so that it may, in one of its positions, bring the openings 71 and 72 to register while cutting off the openings 70 and 73 from the others. In the second position, which is shown in dotted lines, the valve plug may bring the openings 70, 71 on the one hand and the openings 72 and 73, on the other hand, to register.

The closing device 68 is connected to the compressors 62, 63 and with the carburetters 50 so that the inlet connecting branch 64 of the compressor 62 is connected with the opening 71 through a pipe 75. The outlet connecting branch 66 of the compressor 62 is connected with the carburetter 50 through a pipe 76. Connected with said pipe is a branch 77 which leads to the opening 73 of the shutting off device 68.

The outlet connecting branch 67 of the compressor 63 is connected with the opening 72 through the pipe 78. The opening 70 of the control device 68 and the inlet 65 of the compressor 63 lead into the atmosphere.

The operation of the device is as follows:

When the valve plug is in the position shown in full lines, the rotors of both compressors 62 and 63 are rotated when the internal combustion engine is running. There is then an influx of air into the compressor 63 through the inlet connecting branch 65, the air passing through the interval between the casing wall and the jacket to the inlet openings 53 and being received by the vanes which compress it and deliver it through the outlet branch 67. The air passes then to the opening 72 and through 71 and 75 to the inlet 64 of the compressor 62. In said compressor 62 the air compressed in the compressor 63 first flows over the casing wall and then enters the compressor casing where it is further compressed, after which it is led to the carburetter 50 through the outlet 66 and the pipe 76. No air flow takes place through the pipe 77, because the openings 70 and 73 are cut off by the valve plug 74.

When the valve plug 74 is in the position shown in chain lines, air enters the compressor 63 through the inlet 65 and is then led to the carburetter through outlet 67, pipe 78, openings 72 and 73 and pipe 77. At the same time air enters the casing of the control device 68 through opening 70, then the compressor 62 through opening 71, pipe 75 and inlet 64. The air compressed in the compressor 62 is also delivered to the carburetter 50 through outlet 66 and pipe 76.

Of course, many changes may be made without departing from the scope of the invention. For instance, instead of a single compressor the axis of which is parallel to the cylinder axes, two or more such compressors may be used, which may be mounted at both ends of the engine. Furthermore, other compressors may also be mounted at the side of the engine or at any other suitable place instead of being mounted on the cylinder heads; it is only essential that one compressor at least be mounted with its axis parallel to the axes of the cylinders. It is further not necessary that an internal combustion engine with U-shaped cylinders is used; on the contrary, an engine with the usual ordinary cylinders and ordinary pistons may also be used, but an engine with U-shaped cylinders is shown in the drawings, because the particular form and type of the compressors shown ensure particular advantages with an engine of this type. Furthermore, it is for instance not necessary that the connecting pipes between the compressors and the internal combustion engine are arranged in the manner shown and it might be possible to provide the connecting passages in the interior of the engine casing. The invention is, therefore, limited only by the text of the appended claims.

I claim:

1. In an internal combustion engine with a preliminary compressor, the arrangement of the compressor on the front side of the engine with its axis parallel to the axes of the engine cylinders, a second compressor mounted on the top of the engine, and means for driving the second compressor through the first compressor.

2. In an internal combustion engine with a preliminary compressor, the arrangement of the compressor on the front side of the engine with its axis parallel to the axes of the engine cylinders, and a second compressor on the engine cylinder heads with its axis in transversal relation to the axes of the cylinders.

3. In an internal combustion engine with a preliminary compressor, the arrangement of the compressor on the front side of the engine with its axis parallel to the axes of the engine cylinders, the compressor casing being surrounded by a jacket and said jacket being made of one piece with the jacket of the adjacent cylinder, a second compressor mounted on the engine at right angles to the first compressor, and means drivably connecting the first compressor to the second compressor.

4. In an internal combustion engine with a preliminary compressor, the arrangement of the compressor on the front side of the engine with its axis parallel to the axes of the engine cylinders, and a second compressor on the engine cylinder heads with its axis in transversal relation to the axes of the cylinders, the casing of said second compressor being surrounded by a jacket integral with the cylinder heads of the engine cylinders.

5. In an internal combustion engine with a preliminary compressor, the arrangement of the compressor on the front side of the engine with its axis parallel to the axes of the engine cylinders, and a second compressor on the engine cylinder heads with its axis in transversal relation to the axes of the cylinders, and means for driving the rotor of the first compressor from the crank shaft, and means for driving the second compressor from the first compressor.

6. In an internal combustion engine with a preliminary compressor, the arrangement of the compressor on the front side of the engine with its axis parallel to the axes of the engine cylinders, and a second compressor on the engine cylinder heads with its axis in transversal relation to the axes of the cylinders, both compressors being connected with the same carburetters of the internal combustion engine through pipes connected with the outlets for the compressed fluid.

7. In an internal combustion engine with a preliminary compressor, the arrangement of the compressor on the front side of the engine with its axis parallel to the axes of the engine cylinders, and a second compressor on the engine cylinder heads with its axis in transversal relation to the axes of the cylinders, the outlet of the first compressor being connected with the inlet of the second compressor and the outlet of the second compressor with the carburetter of the internal combustion engine.

8. In an internal combustion engine with a preliminary compressor, the arrangement of the compressor on the front side of the engine with its axis parallel to the axes of the engine cylinders, and a second compressor on the engine cylinder heads with its axis in transversal relation to the axes of the cylinders, and pipes between the compressors and one or more carburetters of the internal combustion engine and a shifting member for connecting the pipes, which member is provided, in one of its positions, with a passage with which the outlet of the first compressor and the inlet of the second compressor are connected and, in a second position, with a passage with which the outlet of the second compressor and the carburetter are connected, and a second passage in communication with the atmosphere and with which the inlet of the second compressor is connected, the outlet of the second compressor being connected with the carburetter.

9. In combination with an internal combustion engine having an intake passage, a pair of compressors therefor, each having an intake conduit and an outlet conduit, and a manually operable valve for selectively connecting the outlet conduit of one compressor to the inlet conduit of the second compressor or to the intake passage of the engine, said second compressor having its outlet conduit connected to the engine intake passage at all times.

10. In combination with an internal combustion engine, a pair of compressors for supercharging the engine, and a valve including a valve casing having a plurality of openings and a rotatable partition therein controlling the openings and arranged to connect the superchargers in series or in parallel at the will of the operator.

11. In combination with an internal combustion engine, a pair of compressors for supercharging the engine, and a single valve including a casing having a plurality of openings and a rotatable partition therein operable upon a ninety degree movement arranged to provide communication between two adjacent openings and to connect the superchargers in series or in parallel at the will of the operator.

12. In combination with an internal combustion engine having an intake passage, a pair of compressors for supercharging the engine having intake and outlet conduits, the intake of one compressor being in communication with the atmosphere and the outlet of the second compressor being in communication with the engine intake passage, a casing having four openings distributed about its periphery, two adjacent openings being connected respectively to the outlet of the first compressor and the inlet of the second compressor, the remaining two openings being connected respectively to the engine intake passage and the atmosphere, a rotatable partition in the casing adapted to provide communication between any two adjacent openings on the same side of the partition and adapted to selectively connect the superchargers to the engine in parallel or in series.

ARNOLD ZOLLER.